United States Patent Office 3,726,811
Patented Apr. 10, 1973

3,726,811
PRODUCTION OF CATALYST OR CATALYST SUPPORT
Alfred J. L. Toombs, Berkeley, and Warren E. Armstrong, Lafayette, Calif., assignors to Shell Oil Company, New York, N.Y.
No Drawing. Filed May 7, 1971, Ser. No. 141,405
Int. Cl. B01j 11/40
U.S. Cl. 252—463
5 Claims

ABSTRACT OF THE DISCLOSURE

Alpha alumina of relatively high surface area is produced by (1) impregnating commercial alumina xerogel with carbon-forming material, (2) heating at medium temperature to carbonize, (3) heating the resulting carbon-containing alumina at very high temperature in inert atmosphere thereby converting to alpha alumina of relatively high surface area while preventing reactive sintering during phase change, and (4) finally removing the carbon therefrom by conversion of the carbon to a gaseous carbon compound.

---

The invention herein described was made in the course of or under a contract or subcontract thereunder, with the United States Air Force.

BACKGROUND OF THE INVENTION

Field of the invention

This invention relates to a commercially feasible process for the production from readily available starting materials of sorptive alpha alumina, that is, alpha alumina of relatively high surface area.

Description of the prior art

J. W. Newsome et al., "Alumina Properties," 18, Alcoa Research Laboratories Technical Paper No. 10. Second Revision, Aluminum Company of America, Pittsburgh, 1960, report that alpha alumina usually has surface area less than 1 m.$^2$/g. and is, therefore, nonsorptive. A high surface area form has been prepared. A. S. Russell et al., Ind. Eng. Chem., 42, 1336 (1950) disclose that heating diaspore mineral, a form of beta alumina monohydrate, at 650° C. produced a material having appreciable surface area, about 49 m.$^2$/g., although its X-ray pattern showed only alpha alumina. However, diaspore is a relatively rare form of alumina not readily available. H. Krischner et al., in G. H. Stewart, "Science of Ceramics," 63, vol. 1, Academic Press, London and New York, 1962, report two methods for producing microcrystalline, active alpha alumina. The first method comprises the thermal hydrolysis of aluminum fluoride under special conditions. The second encompasses the reaction of metallic aluminum with steam under pressure from 15 to about 100 atmospheres at temperatures between 320° and 400° C. The cost of the starting materials in these methods limits their commercial feasibility. It would be of advantage to have a commercially feasible process for the production of sorptive alpha alumina from a commercial alumina.

It is known to obtain porosity in metallic oxides by admixing therewith carbonaceous organic filler and ultimately removing the organic matter from the system. See, for example, U.S. 2,337,628; U.S. 2,697,066; U.S. 3,090,094; and D. Basmadjian and co-workers, J. Catalysis, 1, 547 (1962). Heretofore, such processing where the metallic oxide is alumina either has produced an alumina which is not an alpha alumina, e.g., a poorly crystalline alumina, or has produced a nonsorptive or sintered or vitrified form of alpha alumina. In K. J. Notz, "Preparation of Porous Thoria by Incorporation of Carbon in Sols," ORNL–TM–1780, 13, Oak Ridge National Laboratory, Oak Ridge, Tenn., December 1968, is disclosed the production of porous thoria by incorporating carbon in the sol of a sol-gel thoria followed by sintering and carbon burnout. Two general methods were employed to accomplish sintering and burnout: (1) burnout at 800° C,. followed by sintering at 1200, 1300, or 1400° C. in air, and (2) sintering in an argon atmosphere at the latter temperatures, followed by burnout at 800° C. The purpose in this thoria work was to obtain porosity by burning out carbon while previously or subsequently doing some sintering to gain strength. With alumina a different situation prevails. It is known that calcination, i.e., roasting, at high temperatures of the other forms of anhydrous or hydrated alumina produce nonsorptive or alpha alumina of low surface area. In the usual conversion of high-area gamma or similar aluminas to alpha alumina at 1000–1300° C. a reactive sintering occurs and almost all surface area is lost. This reactive sintering is defined as a pronounced growth of ultimate particle size when a transformation from one solid phase to another occurs. It would be of advantage to have a process wherein reactive sintering is prevented during phase change as alumina is changed from its poorly crystalline forms, such as gamma alumina, to the highly crystalline alpha alumina and it would be surprising if such could be accomplished.

SUMMARY OF THE INVENTION

It has now been found that, unexpectedly, sorptive alpha alumina of relatively high surface area of at least about 40 m.$^2$/g. is produced by (1) impregnating a suitable commercial anhydrous or hydrated alumina xerogel with a minor amount of finely dispersed or solubilized carbon-forming material, (2) heating the impregnated alumina xerogel to a temperature of about 400° to 700° C. to carbonize the carbonaceous material, (3) heating the resulting carbonized alumina xerogel, which is predominantly gamma or eta form, to a temperature of at least about 1300° C. in an inert atmosphere thereby converting to alpha alumina of relatively high surface area while preventing reactive sintering during the phase change, and (4) finally removing the carbon from the carbon-filled alpha alumina by conversion of the carbon to a gaseous carbon compound.

DESCRIPTION OF PREFERRED EMBODIMENTS

The starting reactant for the process of the invention is suitably an anhydrous or hydrated alumina. Preferred forms of starting reactant are the commercial alumina xerogels used for catalyst supports, which comprise combinations of predominantly gamma or eta forms of alumina or amorphous alpha alumina monohydrate. Although no particular geometric form is required, it is convenient to utilize alumina xerogel particles greater than $\frac{1}{32}$-inch in diameter owing to their ease of handling.

The alumina xerogel granules are impregnated with a minor amount of finely dispersed or solubilized carbon-forming material. Suitable carbon-forming materials include carbohydrates, organic polymers of natural origin, synthetic polymers with comparatively large solubilities in water, vegetable charcoals, petroleum-derived charcoals, and the like. Representative of these materials are starch, sugars such as sucrose, glucose, lactose, mannose, fructose, and the like, cellulose, gelatin, agar gum arabic, gum tragacanth, polyethylene glycols, polyvinyl alcohols, polyacrylamides, methyl cellulose compounds, coconut charcoal, carbon black, and the like. Preferred are the carbohydrates; especially preferred are starch and sugar. A particularly preferred sugar is sucrose. The carbon-forming material need only be dispersible or soluble in a medium for application to the alumina particles. A preferred medium is an aqueous medium. The concentration of the solutions or dispersions is chosen such that from about 5 to about 25% by weight of carbon based on weight of alumina is loaded thereon. For example, alumina granules are wetted with various sucrose solutions, such as 50% at ambient temperature and 71% sucrose at 80° C. Optionally, the impregnated alumina xerogel granules are then dried to remove most of the solvent. With the preferred solvent, water, drying at 100 to 120° C. is sufficient.

Following the impregnation with carbon-forming material, carbonization is accomplished by heating the impregnated alumina granules at a temperature of from about 400 to about 700° C., preferably at about 500° C., in an inert atmosphere. Suitable inert atmospheres include nitrogen, helium, argon, and the like; nitrogen and helium are particularly preferred. The time required for the carbonization is not critical and will vary with the size of the charge. In most instances about one hour is sufficient.

Optionally, at this point, the impregnation followed by carbonization as described hereinabove may be repeated, for example, even three and five times, in order to further load the alumina particles if need be to achieve a particular weight load of carbon.

The carbonized material is then subjected to very high temperature in an inert atmosphere, which treatment surprisingly converts said carbonized alumina xerogel particles to alpha alumina of relatively high surface area while preventing reactive sintering during the phase change. The temperature range for this treatment is suitably from about 1300° C. to about 1400° C.; preferred is a temperature of at least about 1300° C. Suitable inert atmospheres include nitrogen, helium, argon, neon, and the like; argon is particularly preferred. The time required for the heat treatment is not critical and is suitably in the range of from about 0.2 to 10 hours, depending on size of charge, and the like. Preferably about one to two hours is sufficient to produce the desired product, a carbon-filled alpha alumina of relatively high surface area.

The final step in the process of the invention is the removal of carbon from the hereinabove-produced carbon-filled alpha alumina. The carbon is removed by converting it to a gaseous compound such as methane or carbon dioxide or carbon monoxide. Any such method is suitable as long as the temperature required for that conversion is not substantially greater than about 800° C. Higher temperatures, for example 1000 to 1100° C., in noninert atmospheres cause decline in the surface area of the alpha alumina produced by the process of the invention. A particularly suitable method for removal of the carbon of air, burn it out, preferably slowly, in the presence of air, optionally diluted with nitrogen, at about 800° C., thereby converting the carbon to carbon dioxide and/or carbon monoxide. The time required for removal of the carbon is not critical and will vary with the amount of material and the temperature. In most instances about one to two hours is sufficient. The resulting product is a sorptive alpha alumina of relatively high surface area as measured by the B.E.T. method of at least about 40 m.$^2$/g. and preferably of at least about 45 m.$^2$/g. The B.E.T. method for determining specific surface area is described in detail in S. Brunauer, P. Emmet, and E. Teller, J. Am. Chem. Soc., 60, 309 (1938).

The sorptive alpha alumina of relatively high surface area produced by the process of the invention is a material of established utility. For example, it may be used as a catalyst or catalyst support in processing conducted at 800° C. or lower. As catalyst it is effective in oxidation reactions such as the oxidation of hydrocarbons to oxohydrocarbons, i.e., carbonyl- or carboxyl-containing hydrocarbons, hydrogen to water, and for the reduction of nitrogen oxides with appropriate reducing gases to produce hydrocyanic acid or to produce complete combustion and to produce harmless and deodorized gases. Also, it can be used for hydrogenations such as the hydrogenation of benzene to cyclohexane or organic nitriles to amines such as acetonitrile to ethylamine. As a catalyst support it is effective in refinery hydrocarbon conversion processes and as a support for silver catalyst for ethylene oxide preferably in the preparation of ethylene oxide silver catalysts of the impregnated type rather than the coated type.

EXAMPLE I

Granular 14–18 mesh commercial alumina was wetted with a 50% aqueous solution of sucrose and dried in an oven at 120° C. The material was then heated in an atmosphere of helium for 1.5 hours at 400° C. to carbonize the sucrose within the structure of the alumina. The above treatment was repeated for a total of five times and then the alumina containing 10% by weight of carbon was placed in an atmosphere of argon and heated over a period of 15 minutes to 1300° C. and held at this temperature for one hour. The alumina was then cooled to about 100° C. and then heated in air for 5½ hours at 500° C. to burn out the carbon. The final alumina has a surface area of 86 square meters per gram and gives an X-ray pattern for alpha alumina.

EXAMPLE II

Granular 14–18 mesh commercial alumina of the same lot as for Example I was wetted with a hot 70% aqueous solution of sucrose and dried in an oven at 120° C. The dried material was then heated in an atmosphere of nitrogen for 1 hour at 400° C. to carbonize the sucrose. The carbon-containing alumina was then placed in a flow of argon and heated from 300° C. to 1320° C. over a period of two hours. The temperature was held at 1320° C. for an additional hour and then the alumina was slowly cooled to 100° C. before removing the argon atmosphere. The carbon was then burned from the alumina in the presence of air for 1 hour at 500° C. and 1 hour at 700° C. The final alumina has a surface area of 45 square meters per gram and gives an X-ray pattern for alpha alumina.

EXAMPLE III

Granular 14–18 mesh commercial alumina of the same lot as for Example I was placed in an atmosphere of argon and given the same temperature treatment at 1300° C. as described in Example I. The final alumina has a surface area of 2.6 m.$^2$/g.

We claim as our invention:

1. The process of producing alpha alumina of relatively high surface area of at least about 40 m.$^2$/g. (1) impregnating anhydrous or hydrated alumina xerogel with a carbon-forming material selected from the group consisting of carbohydrates, organic polymers of natural origin, synthetic polymers with comparatively large solubilities in water, vegetable charcoals, and petroleum-derived charcoals, said carbon-forming material being finely dispersed or solubilized in a medium, in an amount such that the resulting mixture contains from about 5% to about 25% by weight carbon based on the weight of alumina, (2) heating the impregnated alumina xerogel to a temperature of about 400° to 700° C. in an inert atmosphere to carbonize the carbonaceous material, (3)

heating the resulting carbonized alumina xerogel to a temperature of at least about 1300° C. in an inert atmosphere thereby converting to alpha alumina of relatively high surface area while preventing reactive sintering during phase change, and (4) finally removing the carbon from the carbon-filled alpha alumina by conversion of the carbon in the presence of an oxygen-containing gas thereby to produce a gaseous carbon compound, said conversion to be effected at a temperature not substantially greater than 800° C.

2. The process according to claim 1 wherein in step (3) said inert atmosphere is argon.

3. The process according to claim 1 wherein in step (1) said carbon-forming material is a carbohydrate.

4. The process according to claim 3 wherein said carbohydrate is starch or sugar.

5. The process according to claim 4 wherein said sugar is sucrose.

References Cited

UNITED STATES PATENTS

| | | | |
|---|---|---|---|
| 3,392,125 | 7/1968 | Kelly | 252—461 |
| 2,112,931 | 4/1938 | Schulze | 23—233 |
| 3,467,602 | 9/1969 | Koester | 252—455 |
| 3,322,494 | 5/1967 | Magee | 23—143 |

DANIEL E. WYMAN, Primary Examiner

W. J. SHINE, Assistant Examiner